US011041731B2

(12) United States Patent
Sweeney et al.

(10) Patent No.: US 11,041,731 B2
(45) Date of Patent: *Jun. 22, 2021

(54) DESTINATION CHANGES IN AUTONOMOUS VEHICLES

(71) Applicant: Uber Technologies, Inc., San Francisco, CA (US)

(72) Inventors: Matthew Sweeney, Pittsburgh, PA (US); Molly Nix, Pittsburgh, PA (US); Emily Bartel, Pittsburgh, PA (US); Logan Rockmore, Pittsburgh, PA (US); Anthony Levandowski, Pittsburgh, PA (US)

(73) Assignee: UBER TECHNOLOGIES, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/545,300

(22) Filed: Aug. 20, 2019

(65) Prior Publication Data

US 2020/0049517 A1 Feb. 13, 2020

Related U.S. Application Data

(63) Continuation of application No. 15/590,194, filed on May 9, 2017, now Pat. No. 10,495,471.

(51) Int. Cl.
*G01C 21/34* (2006.01)
*B60W 50/10* (2012.01)
(Continued)

(52) U.S. Cl.
CPC ......... *G01C 21/3415* (2013.01); *B60W 50/10* (2013.01); *G01C 21/343* (2013.01);
(Continued)

(58) Field of Classification Search
CPC ............ G01C 21/3415; G01C 21/3423; G01C 21/3476; G01C 21/3617; G01C 21/362;
(Continued)

(56) References Cited

U.S. PATENT DOCUMENTS 9,599,477 B1 3/2017 Aula
10,126,138 B1 * 11/2018 Farmer et al. ..... G01C 21/3423
(Continued)

OTHER PUBLICATIONS

ISR and Written Opinion in PCT/US2018/0031510 dated Sep. 27, 2018.

*Primary Examiner* — Dale W Hilgendorf
(74) *Attorney, Agent, or Firm* — Mahamedi IP Law LLP

(57) ABSTRACT

A method for processing destination change requests from passengers of autonomous vehicles can include determining one or more operating parameters for the autonomous vehicle, and based on the one or more operating parameters, determining a feasibility indicator for the autonomous vehicle to travel to the second destination. Based on the feasibility indicator, the method includes determining a suggested destination for the passenger and transmit an instruction to a computing system of the autonomous vehicle causing the autonomous vehicle to reroute to the suggested destination. The method includes transmitting a set of travel directions to a computing device of the passenger, indicating a travel route from the suggested destination to the second destination.

20 Claims, 10 Drawing Sheets

(51) Int. Cl.
*G05D 1/02* (2020.01)
*G01C 21/36* (2006.01)
*G06Q 10/04* (2012.01)
*H04W 4/48* (2018.01)

(52) U.S. Cl.
CPC ..... *G01C 21/3423* (2013.01); *G01C 21/3476* (2013.01); *G01C 21/362* (2013.01); *G01C 21/3617* (2013.01); *G05D 1/021* (2013.01); *G06Q 10/047* (2013.01); *G01C 21/3492* (2013.01); *G01C 21/3605* (2013.01); *H04W 4/48* (2018.02)

(58) Field of Classification Search
CPC .............. G01C 21/343; G01C 21/3605; G01C 21/3492; G06Q 10/047; G05D 1/021; B60W 50/10; H04W 4/48
See application file for complete search history.

(56) References Cited

U.S. PATENT DOCUMENTS

| | | | |
|---|---|---|---|
| 10,495,471 B2* | 12/2019 | Sweeney et al. | G01C 21/3415 |
| 2004/0021583 A1* | 2/2004 | Lau et al. | G01C 21/3617 |
| | | | 701/418 |
| 2010/0324817 A1* | 12/2010 | Hansen et al. | G01C 21/3415 |
| | | | 701/414 |
| 2015/0338849 A1 | 11/2015 | Nemec et al. | |
| 2016/0018230 A1 | 1/2016 | Neubecker | |
| 2016/0069697 A1* | 3/2016 | Oel et al. | G01C 21/3476 |
| | | | 701/426 |
| 2016/0370194 A1 | 12/2016 | Colijin | |
| 2017/0123421 A1 | 5/2017 | Kentley | |
| 2018/0326997 A1 | 11/2018 | Sweeney | |
| 2018/0335310 A1* | 11/2018 | Naoki | G01C 21/3423 |
| 2020/0004250 A1* | 1/2020 | Mangal et al. | G01C 21/343 |
| 2020/0104965 A1* | 4/2020 | Ramot et al. | G06Q 10/047 |

* cited by examiner

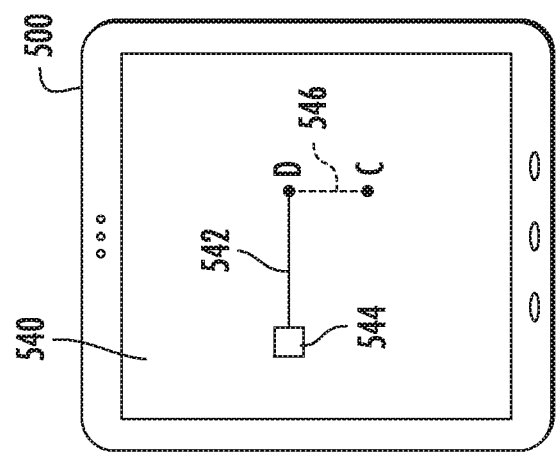
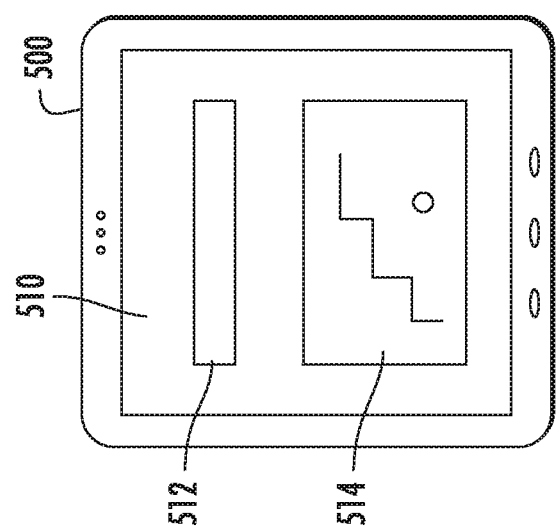
FIG. 7

DESTINATION CHANGES IN AUTONOMOUS VEHICLES

CROSS-REFERENCE TO RELATED APPLICATION

This application is a continuation of U.S. patent application Ser. No. 15/590,194, filed May 9, 2017, which is hereby incorporated by reference in its entirety.

FIELD

The present disclosure relates generally to autonomous vehicles.

BACKGROUND

An autonomous vehicle is a vehicle that is capable of sensing its environment and navigating with little or no human input. In particular, an autonomous vehicle can observe its surrounding environment using a variety of sensors and can attempt to comprehend the environment by performing various processing techniques on data collected by the sensors. Given knowledge of its surrounding environment, the autonomous vehicle can identify an appropriate motion path through such surrounding environment.

SUMMARY

Aspects and advantages of embodiments of the present disclosure will be set forth in part in the following description, or can be learned from the description, or can be learned through practice of the embodiments.

One example aspect of the present disclosure is directed to a method of implementing one or more destination changes in an autonomous vehicle. The method can include obtaining, by the one or more processors, data associated with a destination change request from a passenger of the autonomous vehicle. The destination change request can be indicative of a request to change a first destination of the autonomous vehicle to a second destination. In response to obtaining data associated with the destination change request, the method can include: obtaining, by the one or more processors, data indicative of one or more operating parameters for the autonomous vehicle; determining, by the one or more processors, a feedback response for responding to the destination change request based at least in part on the one or more operating parameters; and providing, by the one or more processors, data associated with the feedback response for presentation via the one or more interfaces to the passenger of the autonomous vehicle. The feedback response can include a suggested destination. The suggested destination can be different from the second destination.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which:

FIG. 7 depicts example interfaces associated with implementing a destination change in an autonomous vehicle according to example embodiments of the present disclosure;

DETAILED DESCRIPTION

Figure 1:
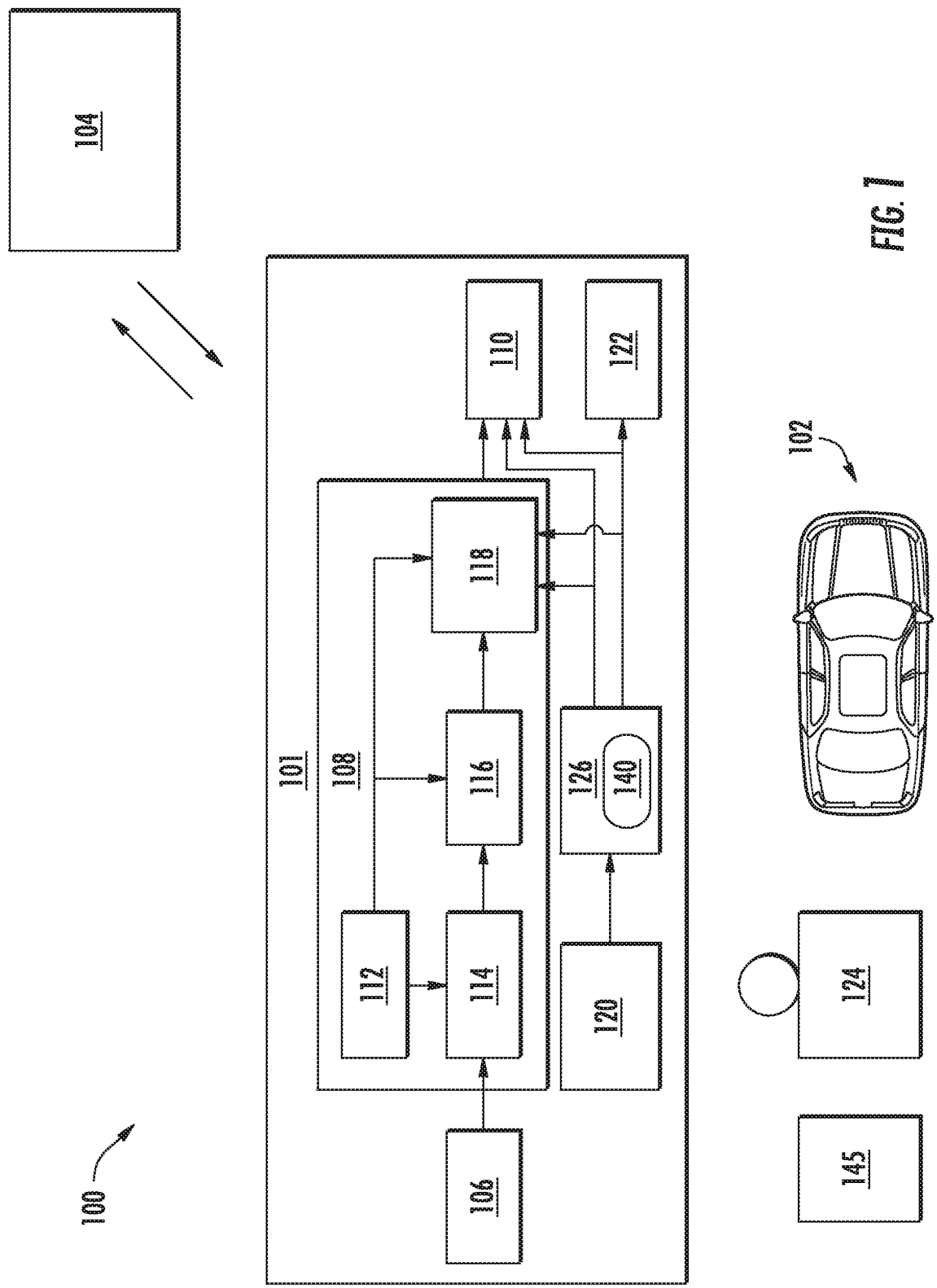
FIG. 1 depicts an example system overview according to example embodiments of the present disclosure.

Reference now will be made in detail to embodiments, one or more example(s) of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to implementing destination changes in autonomous vehicles. An autonomous vehicle can drive, navigate, operate, etc. with minimal and/or no interaction from a human driver. In some instances, a passenger can use an autonomous vehicle to travel to a destination. While the passenger is traveling in the autonomous vehicle to the destination, the passenger may request a destination change. As an example, the passenger may have decided to go to a different destination. As another example, a passenger may have decided to pick up a different passenger at another location. Depending on various factors, such as the location of the autonomous vehicle along a navigation route, parameters of the geographic area, capabilities of the autonomous vehicle, required maneuvers of the autonomous vehicle and/or other factors, the autonomous vehicle may have difficulty traveling to the new destination. Moreover, a better or other alternative destination that is different from the requested destination may be suitable for recommendation to the passenger of the autonomous vehicle.

According to example aspects of the present disclosure, an autonomous vehicle system can determine a feedback response for responding to the requested destination change of the passenger of the autonomous vehicle. The feedback response can take into account current travel parameters (e.g., traffic, length of trip) and operating capabilities of the autonomous vehicle (e.g., required operating maneuvers, time to travel using an autonomous vehicle, travel distance of the autonomous vehicle, etc.). As one example, the feedback response can suggest alternative destinations to the requested destination change that may be more suitable for an autonomous vehicle. For instance, the feedback response may suggest drop off points that are known to be autonomous vehicle friendly.

As another example, the feedback response can suggest alternative destinations if it would shorten the length of a trip using an autonomous vehicle. This can occur in response to the requested destination change. In some embodiments, the feedback response can suggest alternative destinations as the autonomous vehicle is traveling to the destination. For instance, travel parameters such as traffic conditions may change. As a result, an autonomous vehicle may have to reroute in response to the changing traffic conditions, potentially resulting in the autonomous vehicle approaching the requested destination from a different direction. Accordingly, the feedback response can suggest alternative drop off locations that are near the requested destination (e.g., across the street), so that the autonomous vehicle does not have to perform certain travel maneuvers (e.g., a U-turn) in order to reach the requested destination.

In some embodiments, the feedback response can be determined by processing data indicative of one or more operating parameters of the autonomous vehicle associated with traveling to the requested destination. The operating parameters can be, for instance, the time required for the autonomous vehicle to travel to the requested destination; the required travel maneuvers for the autonomous vehicle to travel to the requested destination; whether the autonomous vehicle has to travel too far from its home location; whether the requested destination is on the autonomous vehicle map used to control the autonomous vehicle, etc. If the operating parameters indicate that the autonomous vehicle will have difficulty completing a trip to the requested destination, the feedback response can provide one or more alternative suggested destinations to the passengers that are more suitable for the autonomous vehicle. The feedback response can include travel directions (e.g., walking directions) from each suggested destination to the requested destination.

In some embodiments, when the operating parameters of the autonomous vehicle indicate that the autonomous vehicle will have difficulty traveling to the requested destination (e.g., at least compared to a non-autonomous vehicle), the feedback response can provide a suggested destination for the passenger to switch to a non-autonomous vehicle to complete travel to the requested destination. More particularly, in response to the requested destination change, a determination can be made that the trip to the requested destination would be too difficult for an autonomous vehicle. A non-autonomous vehicle for completing the trip can be ordered for the passenger. The non-autonomous vehicle can meet the autonomous vehicle at a destination for a hand off of the passenger between the autonomous vehicle and the non-autonomous vehicle. The feedback response can provide information associated with hand off to the non-autonomous vehicle to the passenger (e.g., location of the hand off, details concerning the non-autonomous vehicle, etc.).

The feedback response can be provided to the passenger via one or more interfaces, such as an interface presented on one or more of a display screen in the autonomous vehicle, an audio system, a display of a user device carried by the passenger into the autonomous vehicle (e.g., a smartphone, wearable device, tablet, etc.) or other device. A passenger can accept one or more suggested locations (e.g., suggested locations) or other information provided by the feedback response. Instructions can be provided to the autonomous vehicle to complete a trip for the passenger in accordance with the information in the feedback response. In this way, an autonomous vehicle system can provide feedback information associated with operating capabilities of the autonomous vehicle without requiring the presence of a human driver, increasing automation of the autonomous vehicle system.

Example aspects of the present disclosure can provide a number of technical effects and benefits. For instance, the systems and methods according to aspects of the present disclosure can process data to automatically generate a feedback response for a destination change request, increasing automation of the autonomous vehicle. The feedback response can be communicated to passengers via one or more interfaces so that destination changes can be implemented and acted upon by the autonomous vehicle in a timely manner. In this way, the autonomous vehicle may not be required to make unnecessary travel maneuvers (e.g., U-turns, direction changes, etc.). Moreover, use of a feedback response to provide alternative suggested destinations as part of a feedback response can reduce allocation of processing and storage resources of the autonomous vehicle system dedicated to determining routes and travel maneuvers to destinations that may be difficult to attain for an autonomous vehicle. Saved processing and storage resources can be used or reserved, for instance, for improving core functions of the autonomous vehicle system.

Example systems and methods of the present disclosure provide an improvement to autonomous vehicle computing technology. For instance, systems and methods can provide for obtaining, by one or more processors, data associated with a destination change request from a passenger of the autonomous vehicle. In some embodiments, the systems and methods can determine a feedback response for the destination change request based on operating parameters of the autonomous vehicle. The feedback response can provide suggested destinations or other alternate suggestions that provide more convenient locations for an autonomous vehicle to travel. If selected by the passenger, the autonomous vehicle can avoid traveling to difficult destinations, potentially leading to reduced wear and tear on the autonomous vehicle. Moreover, in some embodiments, the feedback response can be determined at a computing system remote from the autonomous vehicle. As a result, processing and storage resources of the autonomous vehicle can be saved or reserved for other functions of the autonomous vehicle.

As used herein, the singular forms "a," "an," and "the" include plural referents unless the context clearly dictates otherwise. The use of the term "about" in conjunction with a numerical value refers to within 20% of the stated amount. As used herein, the terms "first", "second", and "third" may be used interchangeably to distinguish one component from another and are not intended to signify location, order, or importance of the individual components. "Obtaining" data can include receiving, determining, calculating, accessing, reading or otherwise obtaining data.

With reference now to the FIGS., example embodiments of the present disclosure will be discussed in further detail. FIG. 1 depicts an example system 100 according to example embodiments of the present disclosure. The system 100 can include a vehicle computing system 101 associated with a vehicle 102 and an operations computing system 104 that is remote from the vehicle 102.

The vehicle 102 incorporating the vehicle computing system 101 can be a ground-based autonomous vehicle (e.g., car, truck, bus) or other type of vehicle (e.g., aircraft, watercraft). The vehicle 102 can be an autonomous vehicle that can drive, navigate, operate, etc. with minimal and/or no interaction from a human driver. For example, the vehicle 102 can operate semi-autonomously with some interaction from a human driver present in the vehicle 102. The vehicle 102 can be configured to operate in a fully autonomous manner (e.g., self-driving manner) such that the vehicle 102 can drive, navigate, operate, etc. with no interaction from a human driver.

As shown in FIG. 1, the vehicle 102 can include one or more data acquisition systems 106, an autonomy computing system 108, and one or more vehicle control systems 110. One or more of these systems can be configured to communicate with one another via a communication channel. The communication channel can include one or more data buses (e.g., controller area network (CAN)), on-board diagnostics connector (e.g., OBD-II), and/or a combination of wired and/or wireless communication links. The on-board systems can send and/or receive data, messages, signals, etc. amongst one another via the communication channel.

The data acquisitions system(s) 106 can be configured to obtain sensor data associated with one or more objects that are proximate to the vehicle 102 (e.g., within a field of view of one or more of the data acquisition system(s) 106). The data acquisitions system(s) 106 can include a Light Detection and Ranging (LIDAR) system, a Radio Detection and Ranging (RADAR) system, one or more cameras (e.g., visible spectrum cameras, infrared cameras, etc.), motion sensors, and/or other types of imaging capture devices and/or sensors. The sensor data can include image data, radar data, lidar data, and/or other data acquired by the data acquisitions system(s) 106. The object(s) can include, for example, pedestrians, vehicles, bicycles, and/or other objects. The object(s) can be located in front of, to the rear of, and/or to the side of the vehicle 102. The sensor data can be indicative of locations associated with the object(s) within the surrounding environment of the vehicle 102 at one or more times. The data acquisition system(s) 106 can provide the sensor data to the autonomy computing system 108.

In addition to the sensor data, the autonomy computing system 108 can retrieve or otherwise obtain map data 112 associated with the surroundings of the vehicle 102. The map data 112 can provide detailed information about the surrounding environment of the vehicle 102. For example, the map data 112 can provide information regarding: the identity and location of different roadways, road segments, buildings, or other items or objects (e.g., lampposts, crosswalks, curbing, etc.); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, or other traffic control devices); and/or any other map data that provides information that assists the vehicle 102 in comprehending and perceiving its surrounding environment and its relationship thereto.

The autonomy computing system 108 can include a perception system 114, a prediction system 116, and a motion planning system 118 that cooperate to perceive the surrounding environment of the vehicle 102 and determine a motion plan for controlling the motion of the vehicle 102 accordingly. For example, the autonomy computing system 108 can receive the sensor data from the data acquisition system(s) 106, comprehend the surrounding environment by performing various processing techniques on data collected by the data acquisition system(s) 106, and generate an appropriate motion plan through such surrounding environment. The autonomy computing system 108 can control the one or more vehicle control systems 110 to operate the vehicle 102 according to the motion plan.

The autonomy computing system 108 can identify one or more objects that are proximate to the vehicle 102 based at least in part on the sensor data and/or the map data 112. For example, the perception system 114 can obtain state data descriptive of a current state of an object that is proximate to the vehicle 102. The state data for each object can describe, for example, an estimate of the object's: current location (also referred to as position); current speed (also referred to as velocity); current acceleration, current heading; current orientation; size/footprint (e.g., as represented by a bounding polygon); class (e.g., pedestrian class vs. vehicle class vs. bicycle class), and/or other state information. The perception system 114 can provide the state data to the prediction system 116 (e.g., for predicting the movement of an object).

The prediction system 116 can create predicted data associated with each of the respective one or more objects proximate to the vehicle 102. The predicted data can be indicative of one or more predicted future locations of each respective object. The predicted data can be indicative of a predicted path (e.g., predicted trajectory) of at least one object within the surrounding environment of the autonomous vehicle 102. For example, the predicted path (e.g., trajectory) can indicate a path along which the respective object is predicted to travel over time (and/or the speed at which the object is predicted to travel along the predicted path). The prediction system 116 can provide the predicted data associated with the object(s) to the motion planning system 118.

The motion planning system 118 can determine a motion plan for the vehicle 102 based at least in part on the predicted data. The motion plan can include vehicle actions with respect to the objects proximate to the vehicle 102 as well as the predicted movements. For instance, the motion planning system 118 can implement an optimization algorithm that considers cost data associated with a vehicle action as well as other cost functions (e.g., based on speed limits, traffic lights, etc.), if any, to determine optimized variables that make up the motion plan. By way of example, the motion planning system 118 can determine that the vehicle 102 can perform a certain action (e.g., pass an object) without increasing the potential risk to the vehicle 102 and/or violating any traffic laws (e.g., speed limits, lane boundaries, signage). The motion plan can include a planned trajectory, speed, acceleration, etc. of the vehicle 102.

The motion planning system 118 can provide the motion plan indicative of the vehicle actions, a planned trajectory, and/or other operating parameters to the vehicle control system(s) 110 to implement the motion plan for the vehicle 102. For instance, the vehicle 102 can include a mobility controller configured to translate the motion plan into instructions. By way of example, the mobility controller can translate a determined motion plan into instructions to adjust the steering of the vehicle 102 "X" degrees, apply a certain magnitude of braking force, etc. The mobility controller can send one or more control signals to the vehicle control components (e.g., braking control component, steering control component) to execute the instructions and implement the motion plan.

The vehicle 102 can include one or more vehicle component sensors 120 associated with various vehicle components. The vehicle component sensor(s) 120 can include load/weight sensors, audio sensors, temperature sensors, vibration sensors, motion sensors, and/or other types of sensors that are configured to detect a change in status associated with a vehicle component.

The vehicle 102 can include a communications system 122 configured to allow the vehicle computing system 101 (and its computing device(s)) to communicate with other computing devices. The vehicle computing system 101 can use the communications system 122 to communicate with the operations computing system 104 and/or one or more other remote computing device(s) over the network(s) (e.g., via one or more wireless signal connections). In some implementations, the communications system 122 can allow communication among one or more of the system(s) on-board the vehicle 102. The communications system 122 can include any suitable components for interfacing with one or more network(s), including for example, transmitters, receivers, ports, controllers, antennas, or other suitable components that can help facilitate communication with one or more remote computing device(s) that are remote from the vehicle 102.

In some embodiments, the vehicle 102 can be used can provide one or more vehicle services to one or more passengers 124. The vehicle service(s) can include transportation services, courier services, delivery services, and/or other types of services. For instance, the vehicle 102 can operate in an autonomous navigation mode to transport the one or more passengers 124 to a destination location (e.g., while providing rideshare services). In some implementations, the vehicle 102 can be associated with an entity (e.g., a service provider, owner, manager). In some implementations, the entity (e.g., a service provider) can be one that provides one or more vehicle service(s) to a plurality of users via a fleet of vehicles that includes, for example, the vehicle 102. In some implementations, the entity can be associated with only vehicle 102 (e.g., a sole owner, manager). The operations computing system 104 can be associated with the entity.

The vehicle 102 can include one or more computing devices 126 to help control the vehicle 102 based on a passenger-initiated action. The computing device(s) 126 can be, for instance, a tablet, mobile device, display with one or more processors, etc. The computing device(s) 126 can include a display 140 for presenting interface(s) (e.g., GUIs) to a user. The computing device(s) 126 can be included with and/or separate from the autonomy computing system 108 and/or its sub-systems (e.g., perception system 114, prediction system 116, motion planning system 118). The computing device(s) 126 can be configured to communicate with one or more of the other components of the vehicle 102 (e.g., of the vehicle computing system 101). The computing device(s) 126 can include various components for performing various operations and functions. For instance, the computing device(s) 126 can include one or more processor(s) and one or more tangible, non-transitory, computer readable media, each of which are on-board the vehicle 102. The one or more tangible, non-transitory, computer readable media can store instructions that when executed by the one or more processor(s) cause the one or more processor(s) (the vehicle computing system 101) to perform operations and functions, such as those for receiving data indicative of a destination change request and providing a feedback response responsive to the destination change request, as described herein.

In some embodiments, the computing device(s) 126 can include a touch screen and/or other input device for receiving input from a user (e.g., a microphone configured to receive an audio input, a keyboard configured to receive a typed input, etc.). The computing device(s) 126 can include a display screen 140 (e.g., the touch screen) or other output device for providing information, such as a feedback response to a user (e.g., speaker for providing an audio output, etc.).

In some embodiments, an interface associated with the autonomous vehicle system can be presented on a device separate from the autonomous vehicle 102. As an example, the interface(s) 126 can include a user device 145 (e.g., smartphone, tablet, laptop, wearable device, mobile device, etc.). The user device 145 can be capable of being carried by a user while in operation. In some embodiments, a passenger can carry the user device 145 into the autonomous vehicle 102. The user device 145 can receive information (e.g., a feedback response) over a network while the passenger is carrying the device in the autonomous vehicle.

Figure 2:
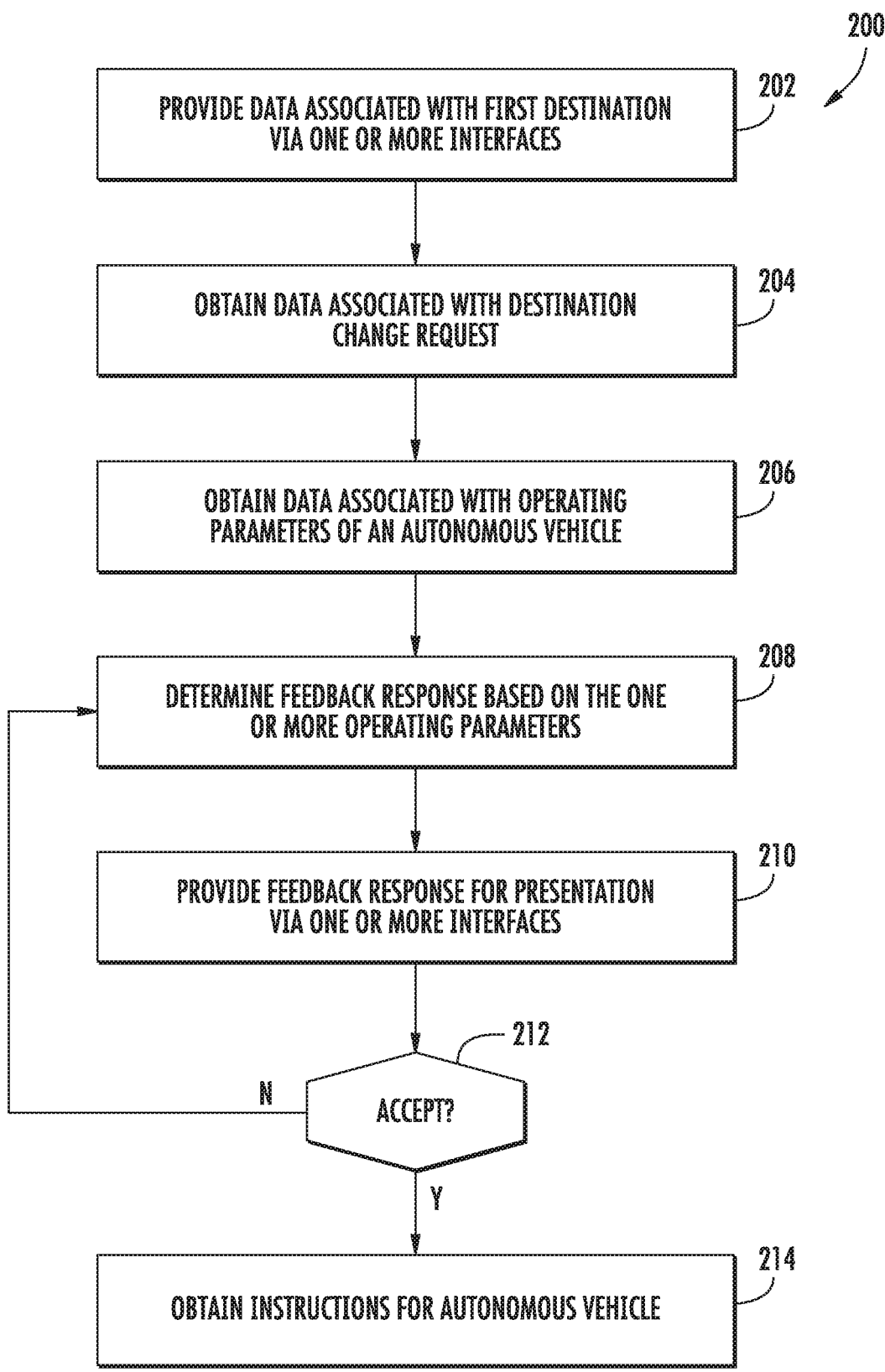
FIG. 2 depicts example flow diagram of an example method according to example embodiments of the present disclosure.

FIG. 2 depicts a flow diagram of an example method 200 of providing a feedback response in response to a destination change request according to example embodiments of the present disclosure. The method 200 can be implemented by one or more processors, such as one or more of the processors of any of the systems depicted in FIG. 1 or FIG. 10. In addition, FIG. 2 depicts steps performed in a particular order for purposes of illustration and discussion. Those of ordinary skill in the art, using the disclosures provided herein, will understand that various steps of any of the methods disclosed herein can be adapted, modified, performed simultaneously, omitted, rearranged, and/or expanded in various ways without deviating from the scope of the present disclosure.

At (202), the method can include providing data associated with a first destination via one or more interfaces to a passenger of an autonomous vehicle. For instance, information identifying an initial destination requested by a passenger of an autonomous vehicle can be provided for display in an interface on a display screen inside an autonomous vehicle. In addition and/or in the alternative, information identifying an initial destination can be provided for output using an output device on a user device carried by a passenger. The initial destination, in some embodiments, can be a destination input by the passenger when requesting a ride in an autonomous vehicle. In some embodiments, the initial destination can be input by the passenger via an interface located within the autonomous vehicle after the passenger has entered the autonomous vehicle.

At (204), the method can include obtaining data associated with a destination change request. The data associated with the destination change request can request that the autonomous vehicle change its destination from an initial destination to a different destination. The data can be associated with a user input via an interface specifying the destination change request. In some embodiments, the data associated with the destination change request can be received while the autonomous vehicle is traveling to the first destination.

In response to obtaining the data indicative of the destination change request, the method can include at (206) obtaining data associated with one or more operating parameters of the autonomous vehicle. The data indicative of one or more operating parameters can include any data associated with the operation or travel of the autonomous vehicle to one or more destinations. The data can be obtained at a vehicle computing system (e.g., vehicle computing system 101 of FIG. 1) and/or a device remote from the vehicle computing system (e.g., operations computing system 104 of FIG. 1). The data can be obtained after the designation change request, periodically and/or otherwise while the autonomous vehicle is traveling to a destination. As discussed in detail below, the data indicative of one or more operating parameters can be used to determine a feedback response for responding to the destination change request.

In some embodiments, the data indicative of the one or more operating parameters can include data indicative of a travel time for the autonomous vehicle to travel to a destination determined, for instance, based on possible routes to the destination, conditions (e.g., traffic conditions) and/or operating capabilities of the autonomous vehicle. As an example, the data indicative of one or more operating parameters can include data indicating that it will take the autonomous vehicle approximately 30 minutes to travel to a particular destination based on existing traffic conditions and travel capabilities of the autonomous vehicle.

In some embodiments, the data indicative of the one or more operating parameters can include data indicative of a travel maneuver required for the autonomous vehicle to travel to a destination. The required travel maneuver can be determined, for instance, based on possible routes to the destination and/or operating capabilities of the autonomous vehicle. For example, the data indicative of one or more operating parameters can include data indicating that the autonomous vehicle will have to make a lane change, a left turn, a U-turn, etc. to travel to a destination.

In some embodiments, the data indicative of the one or more operating parameters can include data indicative of a quantity of travel maneuvers for the autonomous vehicle to travel to a destination. The quantity of travel maneuvers can be determined, for instance, based on possible routes to the destination and/or operating capabilities of the autonomous vehicle. As an example, the data can indicate that the autonomous vehicle will need to make at least four left turns and three lane changes to arrive at a destination.

In some embodiments, the data indicative of one or more operating parameters can include data indicative of a breach of an operation rule for the autonomous vehicle while traveling to a destination. For instance, an autonomous vehicle may have a variety of operating rules to govern autonomous travel. These operating rules can include, for instance, a limited distance the vehicle can travel from a home base, a restriction on types of travel maneuvers (e.g., no U-turns), and/or a restriction on maximum speed. The data indicative of one or more operating parameters can include data indicating whether the autonomous vehicle will breach one of these operating rules while traveling to a destination based on possible routes to the destination and/or operating capabilities of the autonomous vehicle.

In some embodiments, the data indicative of one or more operating parameters can include whether a destination is recognized as part of map data used by the vehicle for autonomous travel. For example, the data indicative of one or more operating parameters can include data indicating that a requested destination is not specified and/or included as part of the map data used by the autonomous vehicle for autonomous travel. Data indicative of other operating parameters can be used without deviating from the scope of the present disclosure.

Referring to FIG. 2 at (208), the method includes determining a feedback response for responding to the destination change request based at least in part on the one or more operating parameters for the autonomous vehicle. The feedback response can provide information to the passenger responsive to the destination change request. For instance, in some embodiments, the feedback response can include a confirmation of the requested destination when the data indicative of the operating parameters indicates that the autonomous vehicle will have little difficulty traveling to the requested destination. In some embodiments, the feedback response can include a suggested destination. The suggested destination can be different from the destination requested in the destination change request. In some example implementations, the suggested destination can be a location near the requested destination that may be of interest to a passenger (e.g., a recommended restaurant, bar, museum, landmark, or other point of interest).

In some embodiments, the suggested destination can be determined based at least in part on the data indicative of the one or more operating parameters of the autonomous vehicle. For instance, if it is determined that it may be difficult for an autonomous vehicle to travel to a requested destination, the feedback response can include a suggested destination that is easier (e.g., quicker, fewer travel maneuvers, etc.) for the autonomous vehicle to travel. The suggested destination can be within a threshold distance of the requested destination. The feedback response can include travel directions and/or other information (e.g., walking directions) from the suggested destination to the requested destination.

In some embodiments, the suggested destination can include a location for the passenger to switch to a non-autonomous vehicle. In these embodiments, the feedback response can provide an indication that it would be easier for the passenger to travel to the requested destination using a non-autonomous vehicle. The autonomous vehicle system can order a non-autonomous vehicle for driving the passenger to the requested destination. A suitable location for the passenger to switch to the non-autonomous vehicle can be identified and included as part of the feedback response as the suggested destination. Details concerning example methods and operations for determining a feedback response will be discussed with reference to FIG. 3 below.

At (210), the method can include provide the feedback response for presentation to the passenger via one or more interfaces. For instance, information associated with the feedback response can be presented in an interface on a display screen or other output device located within the autonomous vehicle. In some embodiments, the feedback response can be communicated to a user device carried by the passenger. The user device can present the feedback response to the passenger using one or more output devices (e.g., display screen, speaker, haptic feedback, etc.) associated with the user device.

In some embodiments, the method can include at (212), obtaining data indicative of a user input confirming and/or accepting the feedback response. For instance, a passenger can provide an input via one or more interfaces indicating an acceptance of the information (e.g., a suggested destination) provided as part of the feedback response. If the passenger has indicated confirmation and/or acceptance, the method can proceed to (214) where instructions are provided and/or determined for the autonomous vehicle to travel to the suggested destination. In this way, instructions can be generated for controlling an autonomous vehicle to travel to a suggested destination in response to a destination change request with reduced passenger interaction, improving the efficiency of the autonomous vehicle system.

If the passenger does not indicate confirmation and/or acceptance, the method can continue to determine different feedback responses (e.g., with different suggested destinations or other information) until the passenger does indicative confirmation and/or acceptance. In cases where no more suggested destinations are accepted or confirmed, a feedback response can be determined to include a statement that the requested destination is not available for the passenger of the autonomous vehicle.

Figure 3:
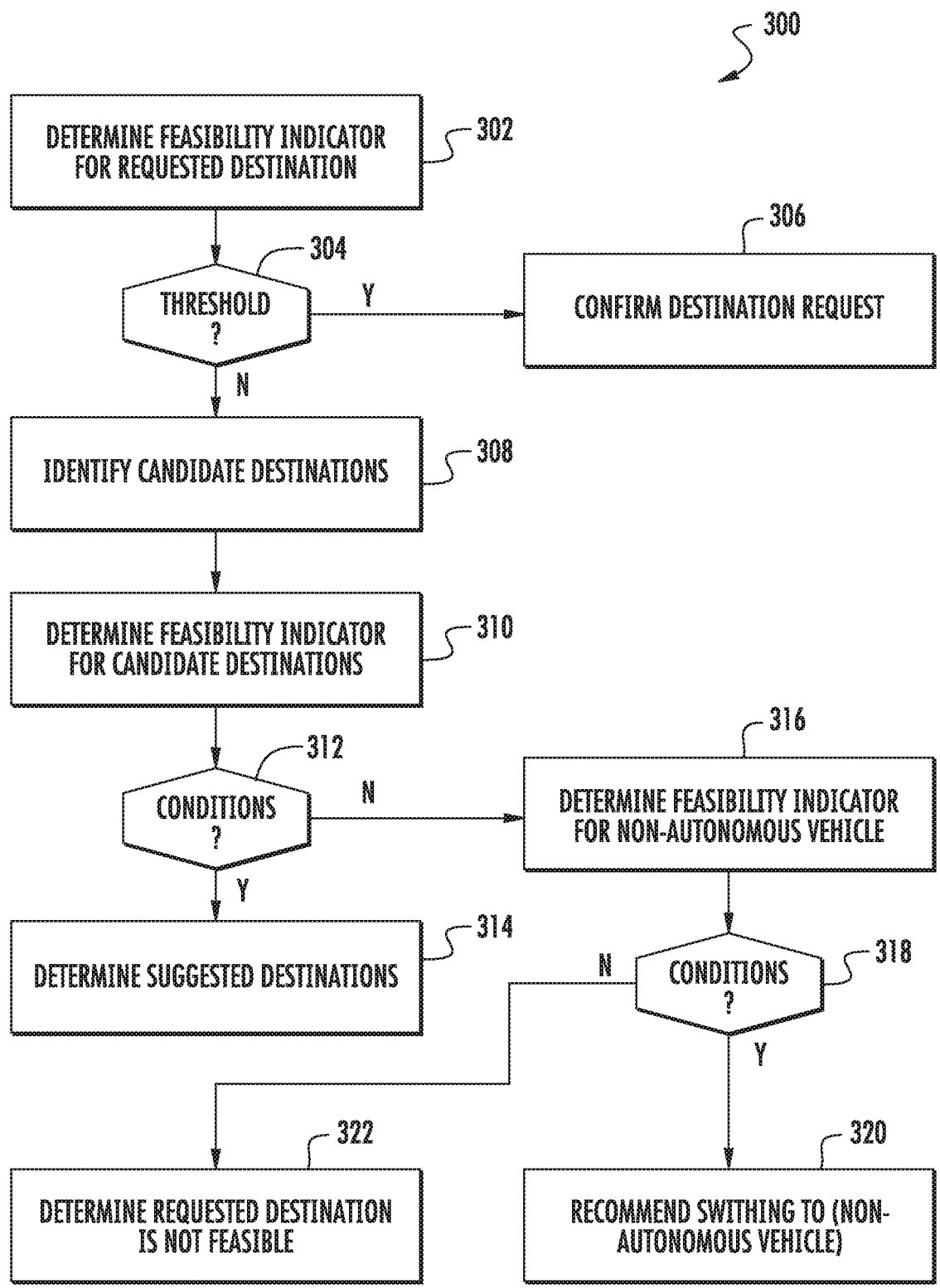
FIG. 3 depicts a flow diagram of an example method according to example embodiments of the present disclosure.

FIG. 3 depicts a flow diagram of example operations associated with a method 300 for determining a feedback response based at least in part on data indicative of one or more operating parameters of an autonomous vehicle according to example aspects of the present disclosure. The method 300 is provided for example purposes. Other suitable methods and/or operations can be used to determine a feedback response based on data indicative of one or more operating parameters of an autonomous vehicle without deviating from the scope of the present disclosure. In addition, FIG. 3 depicts operations performed in a particular order for purposes of illustration and discussion. Those of ordinary skill in the art, using the disclosures provided herein, will understand that the various operations can be adapted, modified, performed simultaneously, omitted, rearranged, and/or expanded in various ways without deviating from the scope of the present disclosure.

At (302), a feasibility indicator can be determined for traveling to the requested destination. The feasibility indicator can be any data indicative of the capability, difficulty and/or convenience of an autonomous vehicle to travel to a destination. In some embodiments, the feasibility indicator can be a feasibility score. The feasibility score can range from, for instance, 0 to 1 or other suitable range (e.g., 0 to 100). In some embodiments, the higher the feasibility the score, the less difficult it is for the autonomous vehicle to travel to the destination, or vice versa.

In some embodiments, the feasibility indicator can be a discretized categorical representation of the feasibility of the autonomous vehicle to travel to the destination. For instance, the feasibility indicator can be discretized into categories such as, "not feasible," "feasible with high difficulty," "feasible with medium difficulty," "feasible with little difficulty," etc. Any number of discretized categories and/or labels can be used without deviating from the scope of the present disclosure.

According to example embodiments of the present disclosure, the feasibility indicator can be determined based at least in part on one or more operating parameters for the autonomous vehicle. For instance, in one example implementation, a weighted averaging algorithm can be used to determine a feasibility score based on operating parameters such as one or more of a travel time for the autonomous vehicle, a travel maneuver for the autonomous vehicle, a quantity of travel maneuvers for the autonomous vehicle, breach of an operation rule for the autonomous vehicle, destination recognition for the autonomous vehicle, or other parameter. Different weights can be assigned to the different parameters in a variety of manners without deviating from the scope of the present disclosure. Any suitable algorithm can be used to calculate the feasibility score without deviating from the scope of the present disclosure.

Referring to FIG. 3 at (304), the feasibility indicator can be compared to a threshold. When the feasibility indicator meets the threshold (e.g., is not greater than the threshold, is not a discretized category required by the threshold, etc.), the feedback response can be determined to confirm the request destination as shown at (306). When the feasibility indicator does not meet the threshold, the operations can proceed to (308) where a plurality of candidate destinations can be identified for analysis.

The candidate destinations can be identified in a variety of manners. For instance, in some embodiments, the candidate destination can be identified from a database of locations known to be autonomous vehicle friendly. In addition and/or in the alternative, locations that are within a threshold distance of the requested destination can be identified as candidate destinations. Other criteria can be used to identify candidate locations. For example, the candidate destinations can be identified based at least in part on passenger preferences, popularity, hours of operation, presence on an autonomous vehicle map used to control the autonomous vehicle, etc.

Once the candidate locations have been identified, the operations can include determining a feasibility indicator for each of the candidate locations (310). Similar to the feasibility indicator for the requested destination, the feasibility indicator for each candidate location can be determined based at least in part on one or more operating parameters of the autonomous vehicle. The feasibility indicator can be a feasibility score and/or a discretized categorical representation.

At (312), it is determined whether any threshold conditions are satisfied. The threshold conditions can be specified in a variety of manners. As an example, a threshold condition can be that the feasibility score for a candidate destination exceeds a feasibility score for the requested destination by a specified amount. If the threshold conditions are satisfied, the operations can determine to include a candidate destination as a suggested location in a feedback response as shown at (314). If no threshold conditions are satisfied, the operations can proceed to (316).

At (316), the operations can include determining a feasibility indicator for travel to the requested destination by a non-autonomous vehicle. The feasibility indicator for travel to the requested destination by a non-autonomous vehicle can be determined based at least in part on one or more operating parameters of the non-autonomous vehicle, such as travel time for the non-autonomous vehicle to arrive at the destination, etc.

At (318), it can be determined whether any threshold conditions are satisfied. As an example, a threshold condition can be that the feasibility score for a candidate destination exceeds a feasibility score for the requested destination by a specified amount. As another example, a threshold condition can be that the passenger can arrive at the requested destination quicker using a non-autonomous vehicle when compared to an autonomous vehicle. If the threshold conditions are satisfied, the operations can determine to recommend switching to a non-autonomous vehicle in a feedback response as shown at (320). If no threshold conditions are satisfied, the operations can proceed to (322) where the feedback response can be determined to indicate to the passenger that the requested destination is not feasible. The feedback response can prompt the passenger of the autonomous vehicle to input a new destination change request with a new requested destination.

Figure 4:
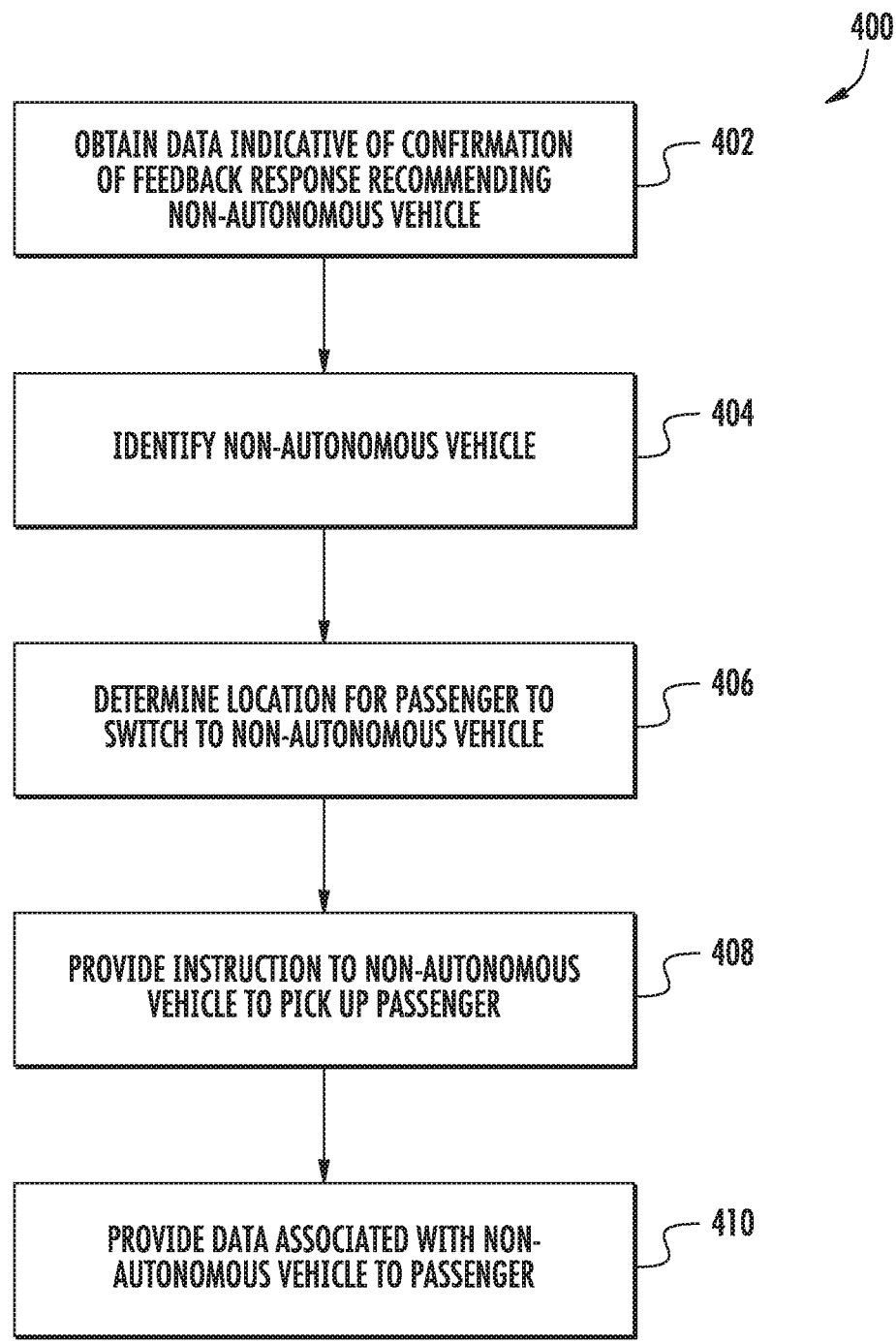
FIG. 4 depicts a flow diagram of an example method according to example embodiments of the present disclosure.

FIG. 4 depicts a flow diagram of example operations associated with a method 400 of implementing a destination change where a passenger switches to a non-autonomous vehicle according to example embodiments of the present disclosure. FIG. 4 depicts operations performed in a particular order for purposes of illustration and discussion. Those of ordinary skill in the art, using the disclosures provided herein, will understand that the various operations can be adapted, modified, performed simultaneously, omitted, rearranged, and/or expanded in various ways without deviating from the scope of the present disclosure.

At (402), the operations can include obtaining data indicative of a passenger input indicating a confirmation and/or acceptance of a feedback response recommending that the passenger switch to a non-autonomous vehicle. For instance, a passenger can provide an input via one or more interfaces indicating an acceptance of the recommendation provided as part of the feedback response.

At (404), the operations can include identifying a non-autonomous vehicle for pick up of the passenger. Once identified, the method can determine a location for the passenger to switch to the non-autonomous vehicle (406). The location can be determined based on a current position of the non-autonomous vehicle, a current position of the autonomous vehicle, and the requested destination. The location for the passenger to switch to the non-autonomous vehicle can be different from the current position of the autonomous vehicle and/or the current position of the non-autonomous vehicle.

At (408), instructions can be provided to the non-autonomous vehicle to pick up the passenger at the determined location. In some embodiments, the instructions can be communicated to a driver of the non-autonomous vehicle via one or more interfaces associated with a user device. The instructions can include details concerning the name of the passenger, the determined location, the requested destination, etc.

At (410), the operations can include providing information associated with the non-autonomous vehicle for presentation to the passenger via one or more interfaces. The information can include, for instance, the location for the passenger to switch to the non-autonomous vehicle.

FIGS. 5-9 depict example interfaces associated with implementing destination changes in autonomous vehicles according to example embodiments of the present disclosure. The interfaces discussed with reference to FIGS. 5-9 provide data associated with example feedback responses. Data associated with other suitable feedback responses determined based at least in part on data indicative of one or more operating parameters of an autonomous vehicle can be presented without deviating from the scope of the present disclosure. In addition, the example interfaces depicted in FIGS. 5-9 are discussed with reference to being presented on a display screen included as part an autonomous vehicle. The interfaces could be presented using other suitable computing devices, such as on a display screen associated with a user device carried by a passenger.

Figure 5:
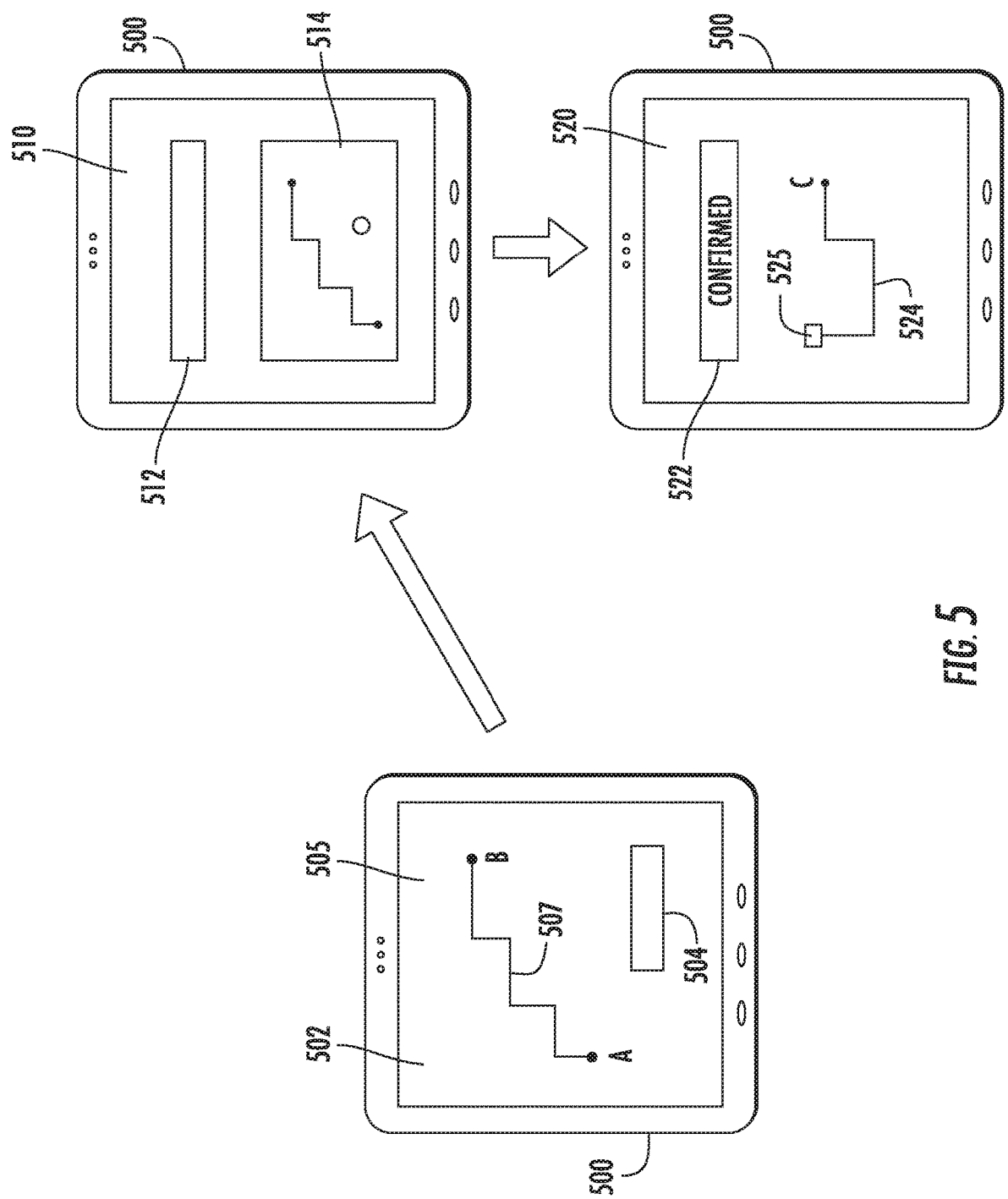
FIG. 5 depicts example interfaces associated with implementing a destination change in an autonomous vehicle according to example embodiments of the present disclosure.

Referring to FIG. 5, a first interface 502 is presented on display 505 of device 500. The first interface 502 provides information associated with a first destination, such as an initial destination requested by a user. For instance, the interface 502 can display a travel route 507 for the autonomous vehicle to travel from Point A to a destination located at Point B. The interface 502 can include an interface element 504. User interaction with the interface element 504 (e.g., a touch interaction) can cause a transition from interface 502 to interface 510.

Interface 510 can be configured to allow a passenger of an autonomous vehicle to input data indicative of a destination change request. In this example, the interface 510 can include a search tool 512 and a map element 514. A passenger of an autonomous vehicle can request a destination change by searching for the new destination using the search tool 512 and/or interacting with the map element 514. For instance, a passenger of an autonomous vehicle can touch a location on the map to request a destination change to a location associated with a point on the map corresponding to the touch interaction. Other suitable techniques for inputting a destination change request can be used without deviating from the scope of the present disclosure.

Interface 520 can present a feedback response that is responsive to the destination change request input via interface 510. As discussed, the feedback response can be determined based at least in part on one or more operating parameters of the autonomous vehicle. In the example of FIG. 5, the feedback response can include a confirmation of the destination change request. More particularly, interface 520 includes an interface element 522 indicating a confirmation of the destination change request. The interface 520 can display a route 524 to the new destination Point C as well as the location of the autonomous vehicle 525 along the route 524.

Figure 6:
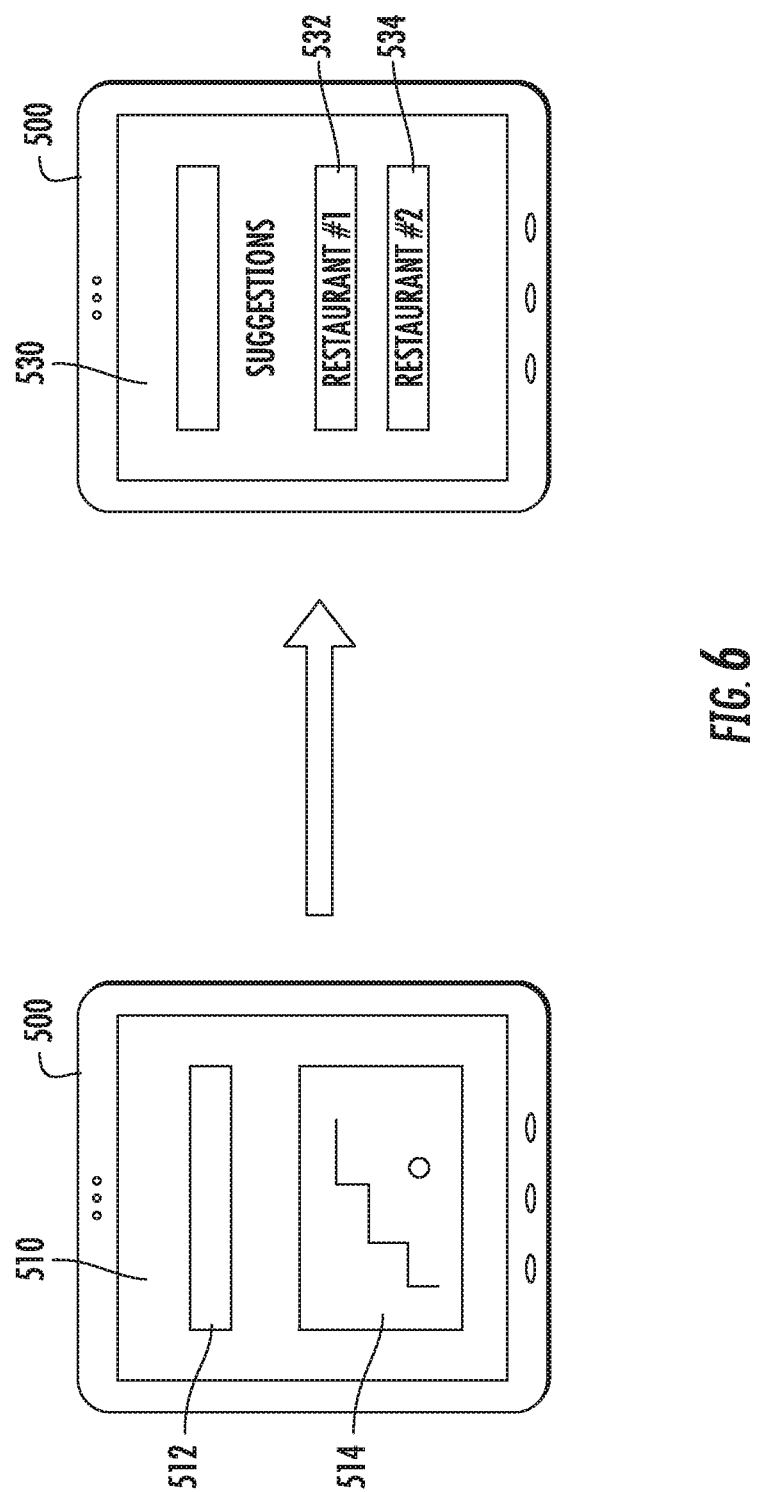
FIG. 6 depicts example interfaces associated with implementing a destination change in an autonomous vehicle according to example embodiments of the present disclosure.

FIG. 6 depicts an example interface 530 associated with a feedback response according to example embodiments of the present disclosure. Interface 530 can be presented in response to a requested destination change request input via interface 510. The interface 530 can present a plurality of suggested destinations. For instance, the interface 530 can include a first interface element 532 associated with a first suggested destination. The interface 530 can include a second interface element 534 associated with a second suggested destination. More or fewer suggested destinations can be presented as part of interface 530 without deviating from the scope of the present disclosure. In the example interface 530, the suggested destinations are displayed in list form.

The suggested destinations can be determined for inclusion as part of the feedback response associated with interface 530 based on a variety of factors, such as similarity with a requested destination, distance to a requested destination, previous destinations of a passenger, popular destinations, etc. In some embodiments, the suggested destinations can be presented as part of a feedback response irrespective of a feasibility of the autonomous vehicle to travel to a requested destination. As an example, a tourist may provide a general request for a general destination (e.g., "downtown") without specificity as to a particular location in the general destination. The feedback response associated with interface 530 can provide suggested destinations (e.g., suggested restaurants) within the general area for selection by the passenger of the autonomous vehicle.

In some embodiments, the suggested destinations can be determined based at least in part on data indicative of one or more operating parameters of the autonomous vehicle so that the destinations are more easily traveled to by the autonomous vehicle. As an example, the suggested destination can be determined from a database of easily accessible locations for an autonomous vehicle that are within a threshold distance of a requested destination. Alternatively, operating parameters of the autonomous vehicle can be analyzed to determine how easy or difficult it will be for the autonomous vehicle to travel to a destination. If a destination is determined to be easy for the autonomous vehicle to travel, the destination can be included as a suggested destination. The suggested destinations can be provided so that the passenger of the autonomous vehicle has the opportunity to select a drop off location that can improve the ride experience of the passenger in the autonomous vehicle.

FIG. 7 depicts an interface 540 associated with a feedback response according to example embodiments of the present disclosure. Interface 540 can be presented in response to a requested destination change request input via interface 510, such as a request to travel to a destination associated with Point C. The interface 540 can be associated with a feedback response that is presented when it is determined, based on one or more operating parameters of the autonomous vehicle, that it may be difficult to travel to the requested destination provided as part of the destination change request.

The interface 540 can include a suggested destination Point D. Point D can be identified based on one or more operating parameters associated with the autonomous vehicle as a more suitable destination for the autonomous vehicle. The interface 540 can present a route 542 to the suggested destination Point D as well as the location of the autonomous vehicle 544 along the route. In addition, the interface 340 can present a route 546 from the suggested destination Point D to the requested destination Point C. The route 546 can be associated with, for instance, walking directions from the suggested destination Point D to the requested destination Point C.

Figure 8:
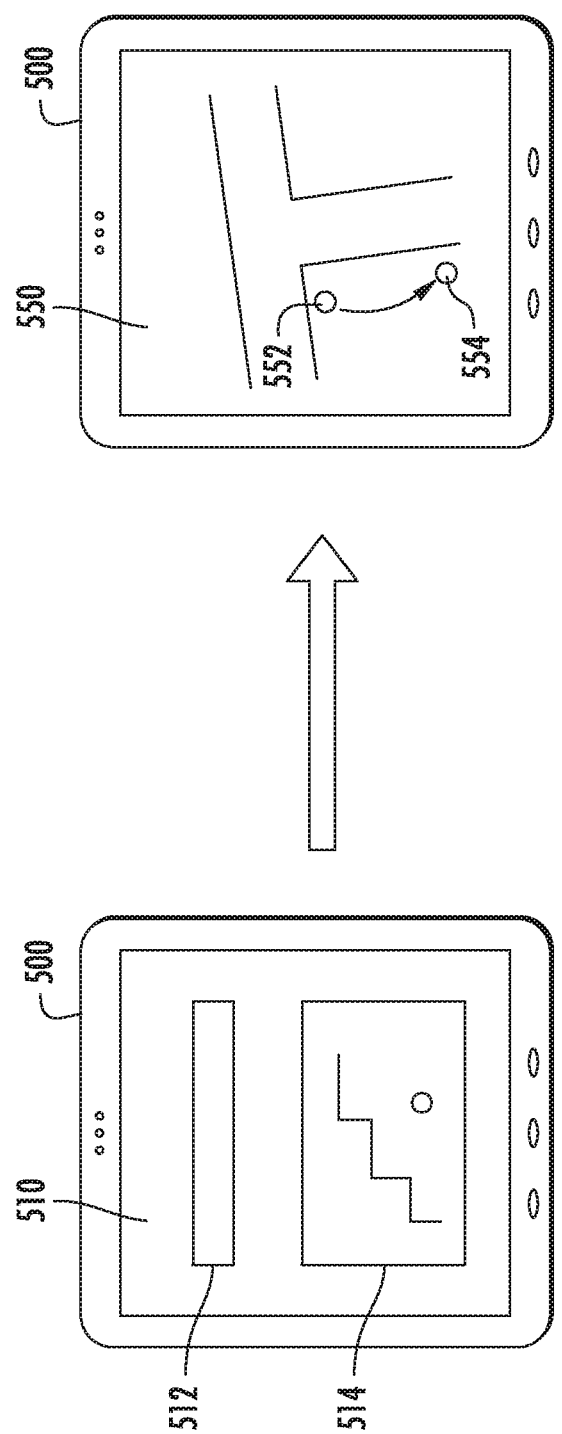
FIG. 8 depicts example interfaces associated with implementing a destination change in an autonomous vehicle according to example embodiments of the present disclosure.

FIG. 8 depicts an example interface 550 associated with a feedback response according to example embodiments of the present disclosure. Interface 550 can be presented in response to a requested destination change request input via interface 510, such as a request to travel to a requested destination associated with a drop off at location 552. As shown, the interface 550 can present a different drop off location 554 as a suggested location for the autonomous vehicle. The drop off location 554 may be determined based on one or more operating parameters of the autonomous vehicle to be more suitable for the autonomous vehicle based on current travel conditions (e.g., traffic, flow patterns, time of day, etc.).

Figure 9:
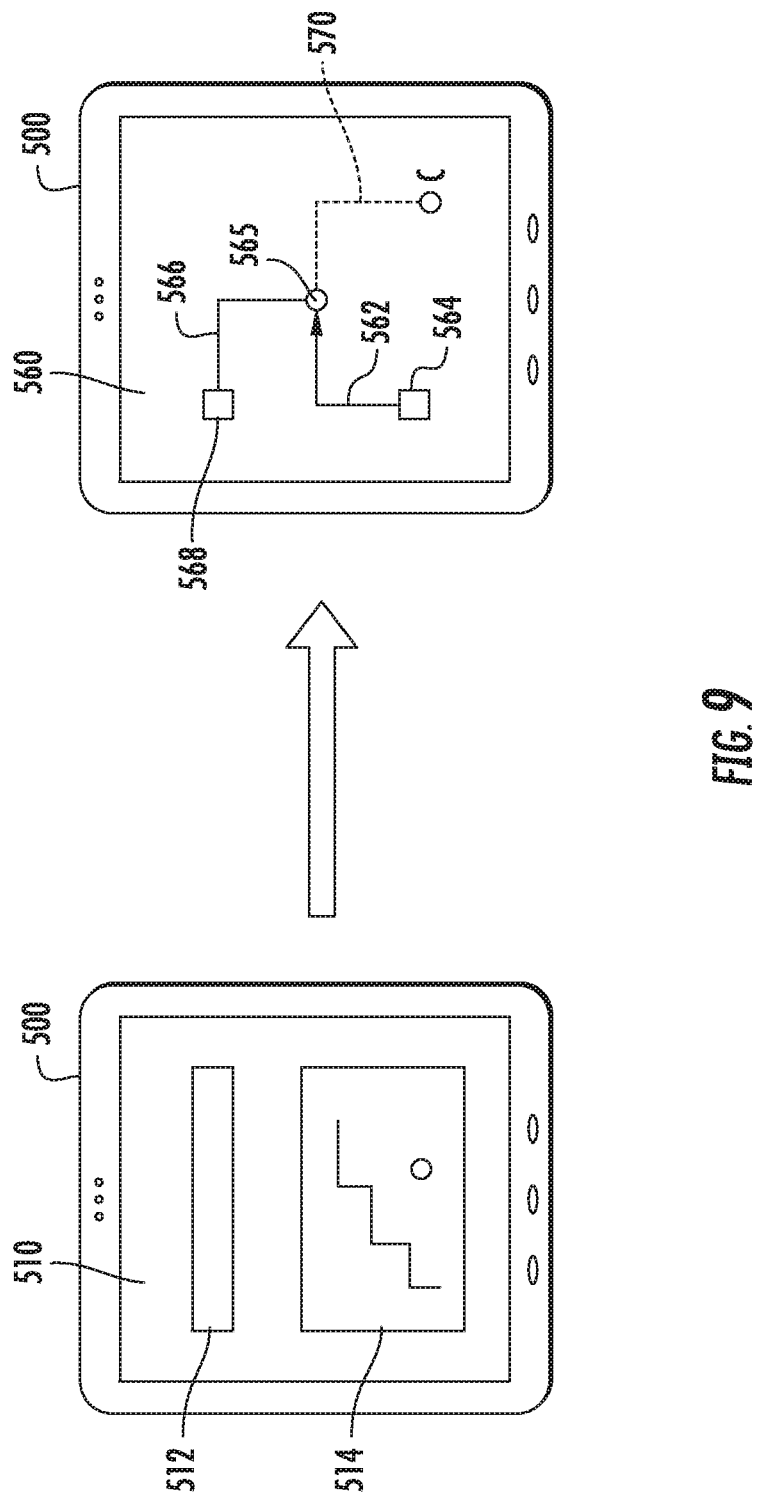
FIG. 9 depicts example interfaces associated with implementing a destination change in an autonomous vehicle according to example embodiments of the present disclosure.

FIG. 9 depicts an example interface 560 associated with a feedback response according to example embodiments of the present disclosure. Interface 560 can be presented in response to a requested destination change request input via interface 510, such as a request to travel to a destination associated with Point C. The interface 560 can be presented as part of a feedback response that recommends the passenger to travel to a requested destination using a non-autonomous vehicle.

As shown, the interface 560 can depict a suggested location 565 for the passenger to switch to the non-autonomous vehicle. The interface 560 can display a route 562 to the location 565 as well as the position of the autonomous vehicle 564 along the route 562. The interface 560 can display a route 566 for a non-autonomous vehicle to reach the location 565 as well as the position of the non-autonomous vehicle 568 along the route 566. The interface 560 can further depict a route 570 for the non-autonomous vehicle to travel to the requested destination Point C.

Figure 10:
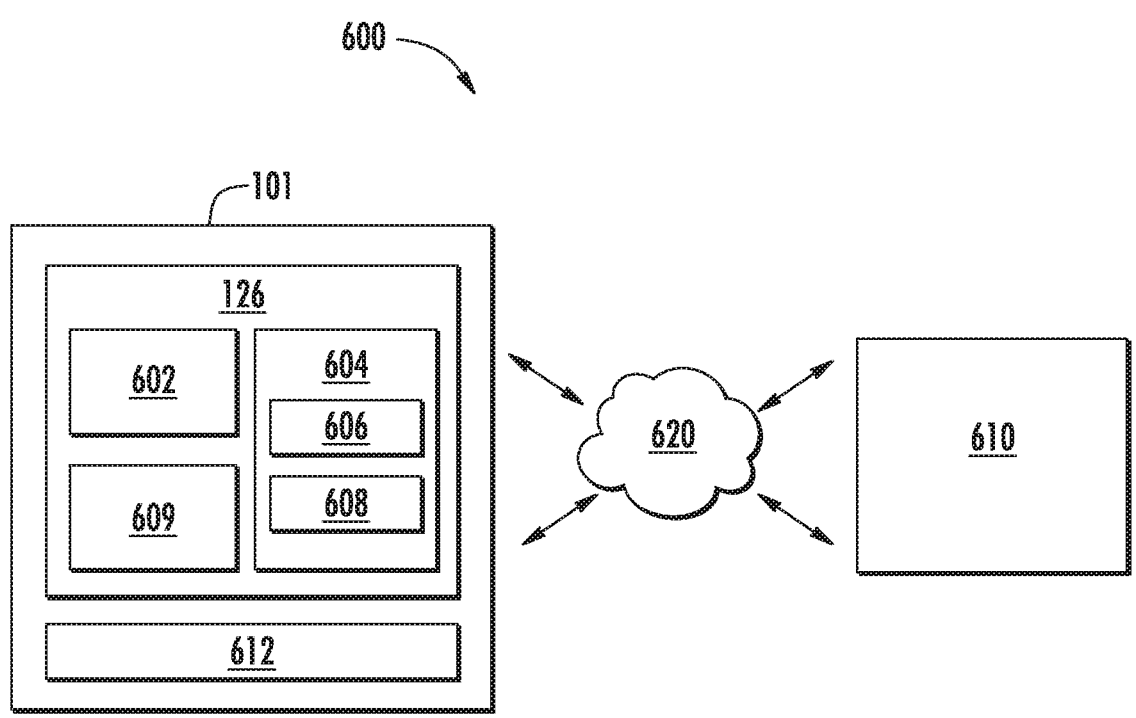
FIG. 10 depicts example system components according to example embodiments of the present disclosure.

FIG. 10 depicts an example computing system 600 according to example embodiments of the present disclosure. The example system 600 illustrated in FIG. 10 is provided as an example only. The components, systems, connections, and/or other aspects illustrated in FIG. 10 are optional and are provided as examples of what is possible, but not required, to implement the present disclosure. The example system 600 can include the vehicle computing system 101 of the vehicle 102 and, in some implementations, a remote computing system 610 including remote computing device(s) that is remote from the vehicle 102 (e.g., the operations computing system 104) that can be communicatively coupled to one another over one or more networks 620. The remote computing system 610 can be associated with a central operations system and/or an entity associated with the vehicle 102 such as, for example, a vehicle owner, vehicle manager, fleet operator, service provider, etc.

The computing device(s) 126 of the vehicle computing system 101 can include processor(s) 602 and a memory 604. The one or more processors 602 can be any suitable processing device (e.g., a processor core, a microprocessor, an ASIC, a FPGA, a controller, a microcontroller, etc.) and can be one processor or a plurality of processors that are operatively connected. The memory 604 can include one or more non-transitory computer-readable storage media, such as RAM, ROM, EEPROM, EPROM, one or more memory devices, flash memory devices, etc., and combinations thereof.

The memory 604 can store information that can be accessed by the one or more processors 602. For instance, the memory 604 (e.g., one or more non-transitory computer-readable storage mediums, memory devices) on-board the vehicle 102 can include computer-readable instructions 606 that can be executed by the one or more processors 602. The instructions 606 can be software written in any suitable programming language or can be implemented in hardware. Additionally, or alternatively, the instructions 606 can be executed in logically and/or virtually separate threads on processor(s) 602.

For example, the memory 604 on-board the vehicle 102 can store instructions 606 that when executed by the one or more processors 602 on-board the vehicle 102 cause the one or more processors 602 (the computing system 101) to perform operations such as any of the operations and functions of the computing device(s) 126 or for which the computing device(s) 126 are configured, as described herein. The memory 604 can store data 608 that can be obtained, received, accessed, written, manipulated, created, and/or stored. In some implementations, the computing device(s) 126 can obtain data from one or more memory device(s) that are remote from the vehicle 102.

The computing device(s) 126 can also include a communication interface 609 used to communicate with one or more other system(s) on-board the vehicle 102 and/or a remote computing device that is remote from the vehicle 102 (e.g., of remote computing system 610). The communication interface 609 can include any circuits, components, software, etc. for communicating with one or more networks (e.g., 620). In some implementations, the communication interface 609 can include, for example, one or more of a communications controller, receiver, transceiver, transmitter, port, conductors, software and/or hardware for communicating data.

In some implementations, the vehicle computing system 101 can further include a positioning system 612. The positioning system 612 can determine a current position of the vehicle 102. The positioning system 612 can be any device or circuitry for analyzing the position of the vehicle 102. For example, the positioning system 612 can determine position by using one or more of inertial sensors, a satellite positioning system, based on IP address, by using triangulation and/or proximity to network access points or other network components (e.g., cellular towers, WiFi access points, etc.) and/or other suitable techniques. The position of the vehicle 102 can be used by various systems of the vehicle computing system 100.

The network(s) 620 can be any type of network or combination of networks that allows for communication between devices. In some embodiments, the network(s) can include one or more of a local area network, wide area network, the Internet, secure network, cellular network, mesh network, peer-to-peer communication link and/or some combination thereof and can include any number of wired or wireless links. Communication over the network(s) 620 can be accomplished, for instance, via a communication interface using any type of protocol, protection scheme, encoding, format, packaging, etc.

The remote computing system 610 can include one or more remote computing devices that are remote from the vehicle computing system 101. The remote computing devices can include components (e.g., processor(s), memory, instructions, data) similar to that described herein for the computing device(s) 126. Moreover, the remote computing system 610 can be configured to perform one or more operations of the operations computing system 104, as described herein.

Computing tasks discussed herein as being performed at computing device(s) remote from the vehicle can instead be performed at the vehicle (e.g., via the vehicle computing system), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A method of implementing one or more destination changes in an autonomous vehicle, the method being performed by one or more processors and comprising:
    receiving a destination change request inputted by a passenger of the autonomous vehicle, the destination change request comprising a request to change a first destination of the passenger to a second destination;
    in response to receiving the destination change request:
        determining one or more operating parameters for the autonomous vehicle;
        based on the one or more operating parameters, determining a feasibility indicator for the autonomous vehicle to travel to the second destination;
        based on the feasibility indicator, determining a suggested destination being different from the second destination;
        transmitting, over one or more networks, an instruction to a computing system of the autonomous vehicle, the instruction causing the computing system to reroute the autonomous vehicle to the suggested destination; and
        transmitting, over the one or more networks, a set of travel directions to a computing device of the passenger, the set of travel directions indicating a travel route from the suggested destination to the second destination.

2. The method of claim 1, wherein the one or more operating parameters comprise at least one of an increased travel time for the autonomous vehicle, one or more travel maneuvers for the autonomous vehicle, breach of an operation rule for the autonomous vehicle, or destination recognition for the autonomous vehicle.

3. The method of claim 1, wherein determining the suggested destination comprises:
    accessing, by the one or more processors, a database of known autonomous vehicle drop off locations;
    based on the second destination, identifying one or more candidate locations from the known autonomous vehicle drop off locations;
    determining a respective feasibility indicator for each of the one or more candidate locations; and
    based on the respective feasibility indicator for each of the one or more candidate locations, selecting, by the one or more processors, the suggested destination from the one or more candidate locations.

4. The method of claim 3, wherein each of the one or more candidate locations is within a threshold distance of the second destination.

5. The method of claim 1, wherein the destination change request is received while the autonomous vehicle is traveling to the first destination.

6. The method of claim 1, wherein the destination change request is received based on a passenger input via one or more interfaces of the autonomous vehicle.

7. The method of claim 6, wherein the one or more interfaces are provided on a display screen located in the autonomous vehicle.

8. The method of claim 1, wherein the destination change request is received from the computing device of the passenger.

9. A computing system comprising:
    one or more processors; and
    a memory storing instructions that, when executed by the one or more processors, cause the computing system to:
        receive a destination change request inputted by a passenger of an autonomous vehicle, the destination change request comprising a request to change a first destination of the passenger to a second destination;
        in response to receiving the destination change request:
            determine one or more operating parameters for the autonomous vehicle;
            based on the one or more operating parameters, determine a feasibility indicator for the autonomous vehicle to travel to the second destination;
            based on the feasibility indicator, determine a suggested destination being different from the second destination;
            transmit, over one or more networks, an instruction to a computing system of the autonomous vehicle, the instruction causing the computing system to reroute the autonomous vehicle to the suggested destination; and transmit, over the one or more networks, a set of travel directions to a computing device of the passenger, the set of travel directions indicating a travel route from the suggested destination to the second destination.

10. The computing system of claim 9, wherein the one or more operating parameters comprise at least one of an increased travel time for the autonomous vehicle, one or more travel maneuvers for the autonomous vehicle, breach of an operation rule for the autonomous vehicle, or destination recognition for the autonomous vehicle.

11. The computing system of claim 9, wherein the executed instructions cause the computing system to determine the suggested destination by:
   accessing, by the one or more processors, a database of known autonomous vehicle drop off locations;
   based on the second destination, identifying one or more candidate locations from the known autonomous vehicle drop off locations;
   determining a respective feasibility indicator for each of the one or more candidate locations; and
   based on the respective feasibility indicator for each of the one or more candidate locations, select, by the one or more processors, the suggested destination from the one or more candidate locations.

12. The computing system of claim 11, wherein each of the one or more candidate locations is within a threshold distance of the second destination.

13. The computing system of claim 9, wherein the destination change request is received while the autonomous vehicle is traveling to the first destination.

14. The computing system of claim 9, wherein the destination change request is received based on a passenger input via one or more interfaces of the autonomous vehicle.

15. The computing system of claim 14, wherein the one or more interfaces are provided on a display screen located in the autonomous vehicle.

16. The computing system of claim 9, wherein the destination change request is received from the computing device of the passenger.

17. A non-transitory computer readable medium storing instructions that, when executed by one or more processors, cause the one or more processors to:
   receive a destination change request inputted by a passenger of an autonomous vehicle, the destination change request comprising a request to change a first destination of the passenger to a second destination;
   in response to receiving the destination change request:
      determine one or more operating parameters for the autonomous vehicle;
      based on the one or more operating parameters, determine a feasibility indicator for the autonomous vehicle to travel to the second destination;
      based on the feasibility indicator, determine a suggested destination being different from the second destination;
      transmit, over one or more networks, an instruction to a computing system of the autonomous vehicle, the instruction causing the computing system to reroute the autonomous vehicle to the suggested destination; and
      transmit, over the one or more networks, a set of travel directions to a computing device of the passenger, the set of travel directions indicating a travel route from the suggested destination to the second destination.

18. The non-transitory computer readable medium of claim 17, wherein the one or more operating parameters comprise at least one of an increased travel time for the autonomous vehicle, one or more travel maneuvers for the autonomous vehicle, breach of an operation rule for the autonomous vehicle, or destination recognition for the autonomous vehicle.

19. The non-transitory computer readable medium of claim 17, wherein the executed instructions cause the one or more processors to determine the suggested destination by:
   accessing, by the one or more processors, a database of known autonomous vehicle drop off locations;
   based on the second destination, identifying one or more candidate locations from the known autonomous vehicle drop off locations;
   determining a respective feasibility indicator for each of the one or more candidate locations; and
   based on the respective feasibility indicator for each of the one or more candidate locations, select, by the one or more processors, the suggested destination from the one or more candidate locations.

20. The non-transitory computer readable medium of claim 19, wherein each of the one or more candidate locations is within a threshold distance of the second destination.

* * * * *